Aug. 16, 1949.　　　S. DE DOMENICO　　　2,479,325
METHOD OF MAKING UNITARY ARTICLES FROM LAMINATIONS
Filed Dec. 4, 1947

WITNESSES:
Robert C. Baird
Wm. C. Groome

INVENTOR
Samuel De Domenico.
BY James H. Ely
ATTORNEY

Patented Aug. 16, 1949

2,479,325

UNITED STATES PATENT OFFICE 2,479,325

METHOD OF MAKING UNITARY ARTICLES FROM LAMINATIONS

Samuel De Domenico, Pittsburgh, Pa., assignor to Westinghouse Electric Corporation, East Pittsburgh, Pa., a corporation of Pennsylvania Application December 4, 1947, Serial No. 789,663

3 Claims. (Cl. 113—112)

This invention relates to the method of brazing and producing unitary articles from a plurality of laminations.

In the making of machine parts, savings can be obtained by fabricating the parts from stampings and laminations and then brazing the laminations into unitary articles. Heretofore, attempts have been made to produce different articles in this manner but difficulties have been encountered in the fixing or securing of the laminations in assembled relation and maintaining them in such assembled position during the brazing operation.

For example, in the brazing operation, pressure is generally applied to the laminations to maintain them closely assembled. In most cases the laminations are stacked between two steel plates and the pressure is applied through the medium of a weight resting upon the upper plate, metal pins being utilized for maintaining the laminations assembled. In such cases, it is found that binding between the plates and the pins is encountered during the brazing operation, the binding effecting distortion or binding of the laminations with resulting incomplete brazing of the laminations. Further, this binding can not be alleviated by reducing the diameter of the pins as misalignment of the laminations is then encountered.

An object of this invention is to provide a method of brazing laminations in which the laminations are maintained under pressure in assembled relation during the brazing.

Another object of the invention is to provide for maintaining laminations which are to be brazed in assembled position by means of pins which are capable of being charred to facilitate the application of pressure to the laminations during the brazing operation.

Figure 1:
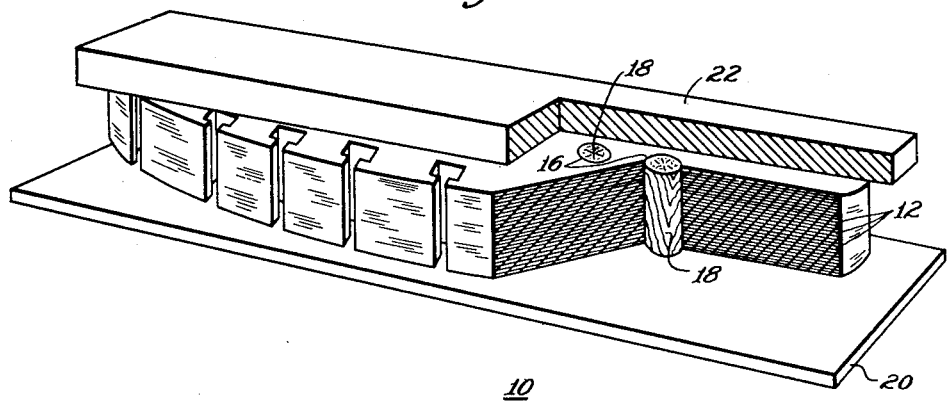
Figure 2:

Other objects of this invention will become apparent from the following description when taken in conjunction with the accompanying drawing, in which:

Fig. 1 is a view in perspective with parts cut away illustrating the assembly of laminations for brazing a unitary article in accordance with this invention; and Fig. 2 is a view in section, greatly enlarged, of a part of the laminations shown in Fig. 1.

Referring to the drawing, this invention is illustrated by reference to an assembly 10 of a plurality of steel laminations 12 for forming a pole end. While this invention is illustrated by reference to the making of such a pole end it is, of course, to be understood that the teachings thereof are applicable to the making of other machine parts and is, therefore, not to be limited to any specific structure.

In practicing this invention, a plurality of the laminations 12 which are of predetermined shape and size are stacked one upon the other to a predetermined height for forming the pole end. In stacking the laminations 12, it is desirable to associate a brazing metal, such as copper or copper alloy, with the laminations so that when subjected to the brazing temperature, as described hereinafter, the brazing metal will wet the laminations and securely bond them into an integral structure.

As shown in Fig. 2 of the drawing, the laminations 12 may be provided with a layer 14 of brazing metal therebetween, although in actual practice, it is preferred that alternate laminations 12 be coated over both surfaces with the brazing metal 14. This may be accomplished by electroplating copper or copper alloy onto the surfaces of certain of the laminations 12, the copper or copper alloy plating preferably being of a thickness of about 0.002 inch. However, where desired the copper or copper alloy brazing metal 14 may be applied between the laminations as a thin sheet of metal independent of the laminations.

In forming the laminations 12, each of the laminations is provided with a plurality of spaced openings 16, as shown in Fig. 1, so that when the laminations 12 are stacked in assembled relation, the openings 16 are in alignment for receiving a suitable holding means. In accordance with this invention, dowel pins 18 are disposed in the spaced openings 16 for holding the laminations 12 in stacked relation. The dowel pins 18 are preferably formed of wood or themo-setting plastic or compacted laminates or any other suitable material which will char or disintegrate when subjected to the temperatures developed in reaching a brazing temperature. Preferably, the dowel pins 18 are formed of wood, as such material is readily available and can be readily formed to any given size for filling the openings 16.

With the laminations 12 stacked and maintained in stacked relation with the brazing metal 18 disposed therebetween and the assembly maintained in stacked relation by means of the dowel pins 18, the assembly is positioned on the stainless steel plate 20 and a heavy weight 22 in the form of the thick plate illustrated is disposed over the face of the upper lamination 12. The plate 22 is of a size for covering the face of the laminations 12 and of sufficient weight for compacting the laminations and maintaining them in close assembled relation during the brazing operation to be next described.

With the laminations 12 assembled between the plates 20 and 22 as described hereinbefore, the assembly 10 is introduced into a suitable brazing furnace (not shown) having a protective atmosphere composed of about 5% carbon dioxide, 10% carbon monoxide, 15% hydrogen, 1% methane and about 69% nitrogen. Other non-oxidizing protective atmospheres such as hydrogen or dissociated ammonia, of course, may be employed although it is found that exceptionally good brazing results are obtained on the steel laminations 12 in such an atmosphere where decarburization is not a factor. The furnace is so heated as to maintain a temperature of between 1090° and 1150° C. therein and when the assembly is introduced therein, the heat developed is sufficient to effect charring or disintegration of the dowel pins 18 as the assembly is being heated to the brazing temperature. As the dowel pins 18 char or disintegrate and the layer of brazing metal 14 between the laminations is melted, the weight of the plate 22 is sufficient to crumble and compact the charred dowel pins 18 and thereby apply the full weight of the plate 22 to compact the laminations 12 to maintain them closely assembled. This is only possible because the charring or disintegration of the dowel pins 18 permits the crumbling of the pins 18 under the weight of the plate 22 so that the weight 22 follows the laminations 12 as the brazing metal 14 melts and bonds the laminations 12. Thus, in effect, the dowel pins 18 become shorter when exposed to the brazing temperature to permit the compacting of the laminations 12 under the influence of the weight of the plate 22.

After the assembly 10 has been subjected to a brazing temperature within the range given hereinbefore and preferably of about 1100° C., the assembly is maintained therein for a few minutes, that is, up to about 10 minutes to assure the complete flow of the brazing metal 14 so as to wet the entire adjacent contacting surfaces of the laminations 12 and effectively penetrate them after which the furnace temperature is reduced to about 1060° C. or about 10° C. below the melting point of the brazing metal whichever is the lower to effectively bond the laminations in the furnace. Thereafter, the assembly 10 is moved to a cooling zone or chamber in the furnace (not shown) where the assembly is preferably cooled to approximately room temperature in the presence of the protective atmosphere utilized during the brazing operation.

In practice it is found that articles produced in the manner described hereinbefore are entirely satisfactory as replacements for solid machine parts, such brazed articles being produced at considerable savings over the corresponding machined articles. The use of the dowel pins 18 of a material which will char or disintegrate under the brazing temperature is particularly satisfactory where a limited number of machine parts are to be produced, making it possible to maintain the laminations in perfect alignment until they are in the brazing furnace whereupon the dowel pins 18 char and permit the weight to bear on the stack of laminations. It is, of course, to be appreciated that the weight of the plate 22 is maintained on the stack throughout the brazing operation and up to and until the time that the brazed article is cooled.

The method described hereinbefore is economical and effects savings over the prior art methods of brazing in that it is not necessary to employ expensive fixturing mechanisms. As is apparent, the laminations can be readily assembled and maintained in such assembled position up to and throughout the brazing operation.

I claim as my invention:

1. The method of producing a unitary article comprising, in combination, stacking a plurality of laminations of predetermined shape and size into cooperating relationship with one another, the laminations having brazing metal associated therewith and being provided with aligned openings therethrough, inserting a pin of a material having sufficient strength and capable of being charred at brazing temperatures in the aligned openings to maintain the laminations in stacked aligned relation, the pin having a size to fill the aligned openings and a length substantially equal to the height of the stack, applying a weight to the stack to distribute pressure to the laminations to maintain the laminations closely assembled, subjecting the stack to heat at a temperature sufficient to melt the brazing metal, maintaining the melting temperature for a period of time sufficient to effect the charring of at least a part of the pin whereby the pressure applied by the weight compacts the charred material of the pin and pressure is maintained on the stack to compact the aligned laminations into engagement with one another, and cooling the stack to a temperature below the melting temperature of the brazing metal to effect the brazing of the aligned laminations into a unitary structure.

2. The method of producing a unitary article comprising, in combination, preparing laminations of predetermined shape and size, applying brazing metal to certain of the laminations, stacking the laminations in aligned relationship, the laminations having aligned openings therethrough, inserting a pin of a material having sufficient strength and capable of being charred at brazing temperatures into the aligned openings to maintain the laminations in stacked aligned relation, the pin having a size to fill the aligned openings and a length substantially equal to the height of the stack, applying pressure to the face of the laminations to maintain the laminations in engaging relation with one another in the stack, subjecting the stack while under pressure to heat at a temperature above the melting point of the brazing metal for a period of time sufficient to effect the charring of at least the ends of the pin whereby the pressure compacts the charred material of the pin and pressure is maintained on the stack as the brazing metal melts to maintain the laminations in aligned engaging relation with one another, and cooling the stack to below the melting temperature of the brazing metal while maintaining the pressure on the stack to effect the brazing of the aligned laminations into a unitary structure.

3. The method of producing a unitary article comprising, in combination, stacking a plurality of laminations of predetermined shape and size into engaging cooperating relationship with one another, the laminations having brazing metal associated therewith and being provided with aligned openings therethrough, inserting a wood pin into the aligned openings to maintain the laminations in stacked relation, the pin having a size to fill the openings and a length substantially equal to the height of the stack, applying a weight to the stack to distribute pressure over the laminations to maintain them in engaging relation, subjecting the stack while under pressure to heat at a temperature above the melting point of the brazing metal, the heat effecting the charring of the wood pin to effect a disintegration of the wood pin under the pressure applied whereby the pressure maintains the laminations in engaging relation as the brazing metal melts, and cooling the stack while under pressure to a temperature below the melting temperature of the brazing metal to effect the brazing of the laminations into a unitary structure.

SAMUEL DE DOMENICO.

REFERENCES CITED

The following references are of record in the file of this patent:

UNITED STATES PATENTS

| Number | Name | Date |
|---|---|---|
| 2,306,925 | Aicher | Dec. 29, 1942 |